United States Patent
Oishi

(10) Patent No.: US 8,135,784 B2
(45) Date of Patent: Mar. 13, 2012

(54) COMMUNICATION SYSTEM AND E-MAIL CHECK METHOD

(75) Inventor: Tomoo Oishi, Shizuoka (JP)

(73) Assignee: NEC Access Technica, Ltd., Shizuoka (JP)

( * ) Notice: Subject to any disclaimer, the term of this patent is extended or adjusted under 35 U.S.C. 154(b) by 485 days.

(21) Appl. No.: 12/047,348

(22) Filed: Mar. 13, 2008

(65) Prior Publication Data

US 2008/0250098 A1  Oct. 9, 2008

(30) Foreign Application Priority Data

Apr. 5, 2007  (JP) .................................. 2007-98993

(51) Int. Cl.
G06F 15/16  (2006.01)
(52) U.S. Cl. ..................... 709/206; 709/217; 709/219
(58) Field of Classification Search .................... 709/206
See application file for complete search history.

(56) References Cited

U.S. PATENT DOCUMENTS

| 6,128,101 A * | 10/2000 | Saito ............................. 358/402 |
| 6,185,604 B1 * | 2/2001 | Sekiguchi ..................... 709/206 |
| 7,299,260 B2 * | 11/2007 | Shino ............................ 709/206 |
| 2003/0172118 A1 * | 9/2003 | Bilansky et al. .............. 709/206 |
| 2005/0021637 A1 * | 1/2005 | Cox ............................... 709/206 |

FOREIGN PATENT DOCUMENTS

| JP | 11-312068 A | 11/1999 |
| JP | 2002-223253 A | 8/2002 |
| JP | 2007-34559 A | 2/2007 |
| KR | 1999-0084404 A | 12/1999 |

* cited by examiner

Primary Examiner — Jeffrey Pwu
Assistant Examiner — Jasmine Myers
(74) Attorney, Agent, or Firm — Sughrue Mion, PLLC

(57) ABSTRACT

A communication device which accesses a mail server includes an acquisition unit and a judgment unit. The acquisition unit periodically accesses the mail server and acquires a total number of mails at each access. The judgment unit compares a total number of mails currently acquired with a total number of mails acquired last time and judges whether or not a new incoming mail is present and whether or not a different communication device receives a mail from the mail server, based on a result of said comparison.

6 Claims, 7 Drawing Sheets

COMMUNICATION SYSTEM AND E-MAIL CHECK METHOD

RELATED APPLICATIONS

This application is based on Japanese Patent Application No. JP 2007-098993 filed on Apr. 5, 2007, and including a specification, claims, drawings and summary. The disclosure of the above Japanese Patent Application is incorporated herein by reference in its entirety.

BACKGROUND OF THE INVENTION

1. Field of the Invention

The present invention relates to a communication system and an e-mail check method.

2. Description of the Related Art

An e-mail system which exchanges information such as a message through a network is used widely. An e-mail is received by a predetermined mail reception protocol. A POP 3 (Post Office Protocol 3) is one of mail reception protocols which are widely used at present. However, a command for determining whether or not a new incoming mail is present is not provided in a POP3. Accordingly, when checking whether or not a new incoming mail is present, a user has to access to a mail server and to check her or his own mailbox.

Japanese Patent Application Laid-Open No. 2007-034559 discloses one solution for solving the above-mentioned problem. The official bulletin discloses a mobile terminal which automatically notifies a user of existence of a new incoming mail. Specifically, the mobile terminal periodically transmits a message for requesting a mail server to check a mail storage state and detects a change in a state from a previous mail storage state to check existence of a new incoming mail. Due to such a configuration, a user can recognize existence of a new incoming mail in real time without a user's unnecessary operation.

There are many kinds of forms for realizing an e-mail system. For example, there is an e-mail system in which one user has a plurality of communication devices (for example, a cellular phone and a personal computer) and accesses a common mail server from each of the communication devices to receive an e-mail. In such e-mail system, because a mail server receives access from a plurality of communication devices, a storage state of a received mail in a mailbox changes in a complicated manner in comparison with an e-mail system in which only one communication device accesses a mail server. Accordingly, a judgment of whether or not a new incoming mail is present becomes complicated.

However, the e-mail system disclosed in the above-mentioned official bulletin is not an e-mail system in which a plurality of communication devices access one mail server. Actually, a judgment of whether or not a new incoming mail is present described in the official bulletin is just a comparison between the last known storage state in a mailbox and a new known storage state. Accordingly, the above-mentioned problem of an e-mail system in which a mail server receives access from a plurality of communication devices and a storage state of a received mail in a mailbox intricately changes is not solved by the configuration disclosed in the official bulletin.

SUMMARY OF THE INVENTION

An exemplary object of the present invention is to provide a communication device and an e-mail check method which are capable of accurately grasping a reception state of a new incoming mail without a user's unnecessary operation.

A communication device which accesses a mail server according to an exemplary aspect of the invention includes an acquisition unit and a judgment unit. The acquisition unit periodically accesses the mail server and acquires a total number of mails at each access. The judgment unit compares a total number of mails currently acquired with a total number of mails acquired last time and judges whether or not a new incoming mail is present and whether or not a different communication device receives a mail from the mail server, based on a result of said comparison.

An e-mail check method in a communication device which accesses a mail server according to an exemplary aspect of the invention includes accessing the mail server periodically and acquiring a total number of mails at each access, comparing a total number of mails currently acquired with a total number of mails acquired last time and judging whether or not a new incoming mail is present and whether or not a different communication device receives a mail from the mail server, based on a result of said comparison.

Other exemplary features and advantages of the present invention will be apparent from the following description taken in conjunction with the accompanying drawings, in which like reference characters designate the same or similar parts throughout the figures thereof.

BRIEF DESCRIPTION OF THE DRAWINGS

Exemplary features and advantages of the present invention will become apparent from the following detailed description when taken with the accompanying drawings in which.

DETAILED DESCRIPTION OF THE EXEMPLARY EMBODIMENTS

Figure 1:
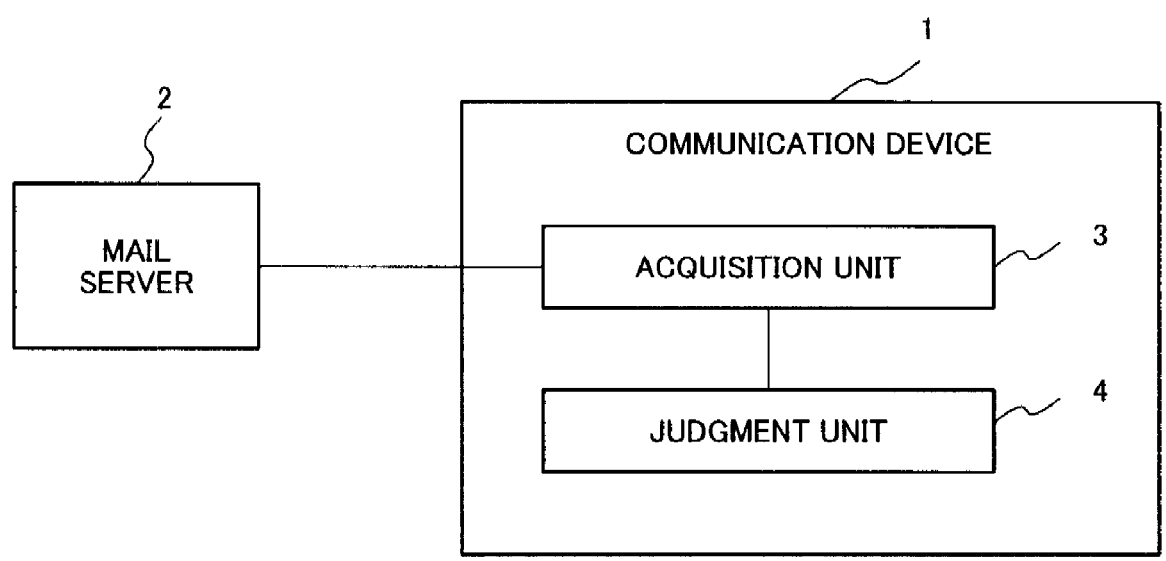
FIG. 1 is an example of a control block diagram of a communication device according to a first exemplary embodiment of the present invention.

Hereinafter, an exemplary embodiment of the present invention will be described in detail with reference to a drawing. FIG. 1 is an example of a control block diagram of a communication device according to a first exemplary embodiment of the present invention. The communication device 1 accesses a mail server 2. The communication device 1 includes an acquisition unit 3 and a judgment unit 4. The acquisition unit 3 periodically accesses the mail server 2 and acquires a total number of mails at each access. The judgment unit 4 compares a total number of mails currently acquired with a total number of mails acquired last time and judges whether or not a new incoming mail is present and whether or not a different communication device receives a mail from the mail server 2, based on a result of the comparison. Accordingly, a user can accurately grasp a reception state of a new incoming mail without a user's unnecessary operation.

Figure 2:
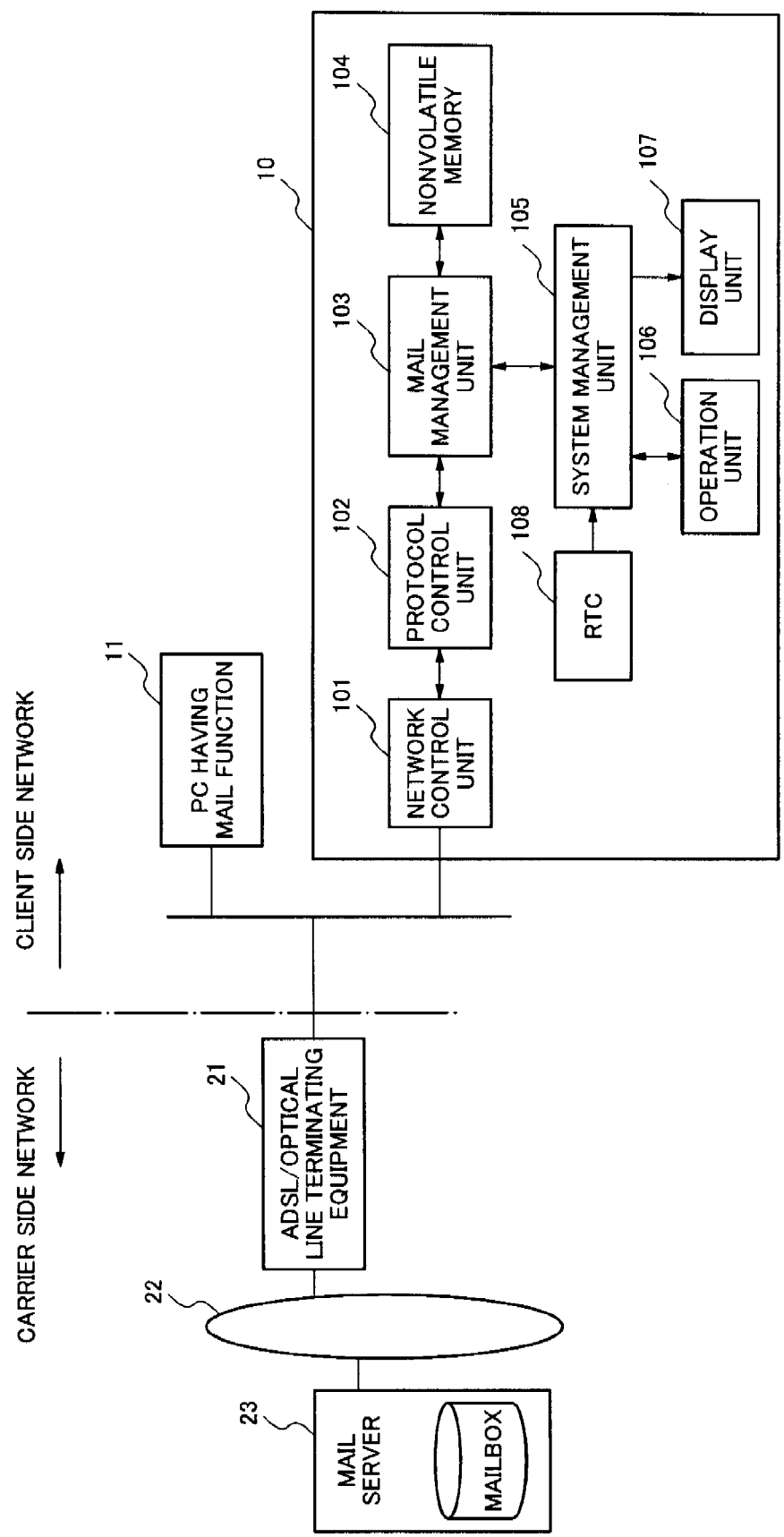
FIG. 2 is an example of a control block diagram of an e-mail system including a communication device according to a second exemplary embodiment of the present invention.

FIG. 2 is an example of a control block diagram of an e-mail system including a communication device 10 according to a second exemplary embodiment of the present invention. The e-mail system includes a client side network and a carrier side network. The client side network includes at least one communication device 10 and at least one personal computer (hereinafter, referred to as a PC) 11. The carrier side network includes ADSL/optical line terminating equipment 21, a network 22 and a mail server 23. Here, for example, the network 22 is an IP network such as the Internet based on TCP/IP. The communication device 10 and the PC 11 can be connected to the Internet via the ADSL/optical line terminating equipment 21, respectively.

The communication device 10 and the PC 11 include a mail receiving function, respectively. A mail account for accessing the mail server 23 is provided to the communication device 10 and the PC 11 by a mail service provider. That is, a user can read a mail addressed to oneself by using either the communication device 10 or the PC 11.

The communication device 10 includes a network control unit 101, a protocol control unit 102, a mail management unit 103, a nonvolatile memory 104, a system management unit 105, an operation unit 106, a display unit 107 and an RTC (Real Time Clock) 108.

The network control unit 101 controls an interface with a client side network. The protocol control unit 102 controls an operation of various protocols such as TCP/IP and POP3. The mail management unit 103 checks whether or not a new incoming mail is present and manages a mail reception. The nonvolatile memory 104 stores the total number of mails.

The system management unit 105 comprehensively manages the communication device 10. For example, the system management unit 105 instructs the mail management unit 103 to check whether or not a new incoming mail is present and to perform an operation of a mail reception from the mail server 23 at a constant time interval based on time information from the RTC 108. A user operates the operation unit 106. For example, the operation unit 106 includes a keypad or a touch panel, or the like. The display unit 107 displays various kinds of information for example, information of whether or not a new incoming mail is present. The display unit 107 includes for example, an LED (Light Emitting Diode) or an LCD (Liquid Crystal Display).

Further, the communication device 10 mentioned above is a computer, a telephone set or a facsimile (FAX) apparatus typically, but an apparatus other than the above mentioned apparatuses also can be used.

Figure 3:
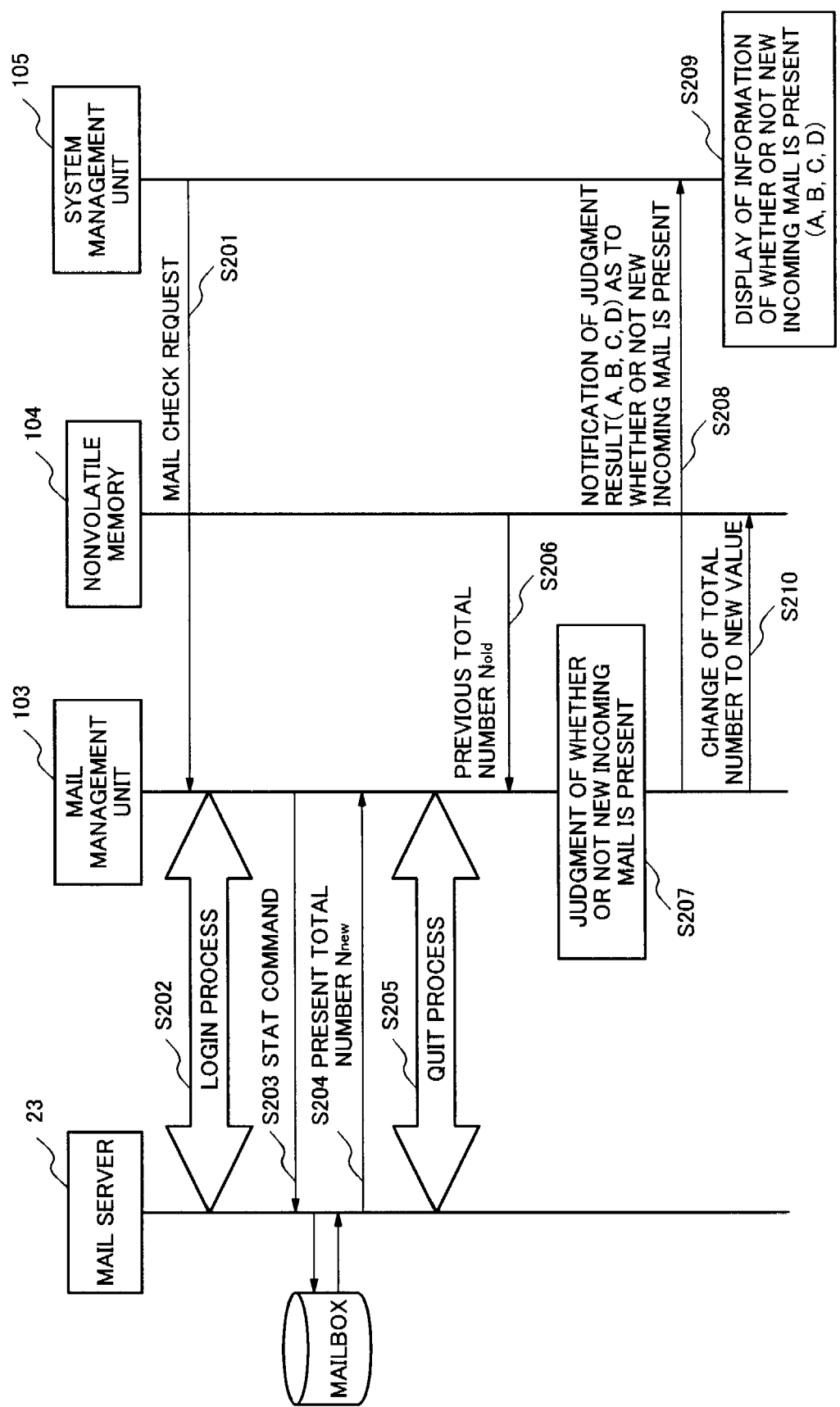
FIG. 3 is an example of a flowchart illustrating an operation of a communication device shown in FIG. 2.

FIG. 3 is an example of a flowchart illustrating an operation of the communication device 10. The system management unit 105 judges the passage of a predetermined time by referring to the RTC 108. The system management unit 105 transmits a mail check request to the mail management unit 103 after each passage of a predetermined time (step S201). Upon receipt of the mail check request, the mail management unit 103 logs in to the mail server 23 by controlling the protocol control unit 102 and the network control unit 101 (step S202).

After the login, the mail management unit 103 transmits a STAT command in POP3 to the mail server 23 (step S203). Here, a STAT command is a well-known command in POP3 and the mail server 23 which receives the command returns the total number of mails stored in a mailbox and the total number of bytes. The mail management unit 103 obtains the total number $N_{new}$ of mails stored in a mailbox at present time from a mail server (step S204). After obtaining the present total number $N_{new}$ of mails, the mail management unit 103 performs a QUIT process to end a POP3 session with the mail server 23 (step S205).

The mail management unit 103 obtains the previous total number $N_{old}$ of mails from the nonvolatile memory 104 (step S206). The mail management unit 103 judges whether or not a new incoming mail is present by comparing the present total number $N_{new}$ of mails and the previous total number $N_{old}$ of mails (step S207). A judgment of whether or not a new incoming mail is present is described below in detail. After judging whether or not a new incoming mail is present, the mail management unit 103 notifies the system management unit 105 of a judgment result as to whether or not a new incoming mail is present (step S208). The system management unit 105 performs a display control of the display unit 107 based on the judgment result as to whether or not a new incoming mail is present (step S209). The mail management unit 103 changes the data stored in a nonvolatile memory 104 from the previous total number $N_{old}$ of mails to the present total number $N_{new}$ of mails (step S210).

Further, information about the total number of mails kept on the mail server 23 is cleared to zero by a DELE command in POP3. A DELE command is issued after reception of a mail by the communication device 10 or the PC 11. However, information about the total number of mails needs not necessarily be cleared to zero. The information there about can be successively accumulated.

Figure 4:
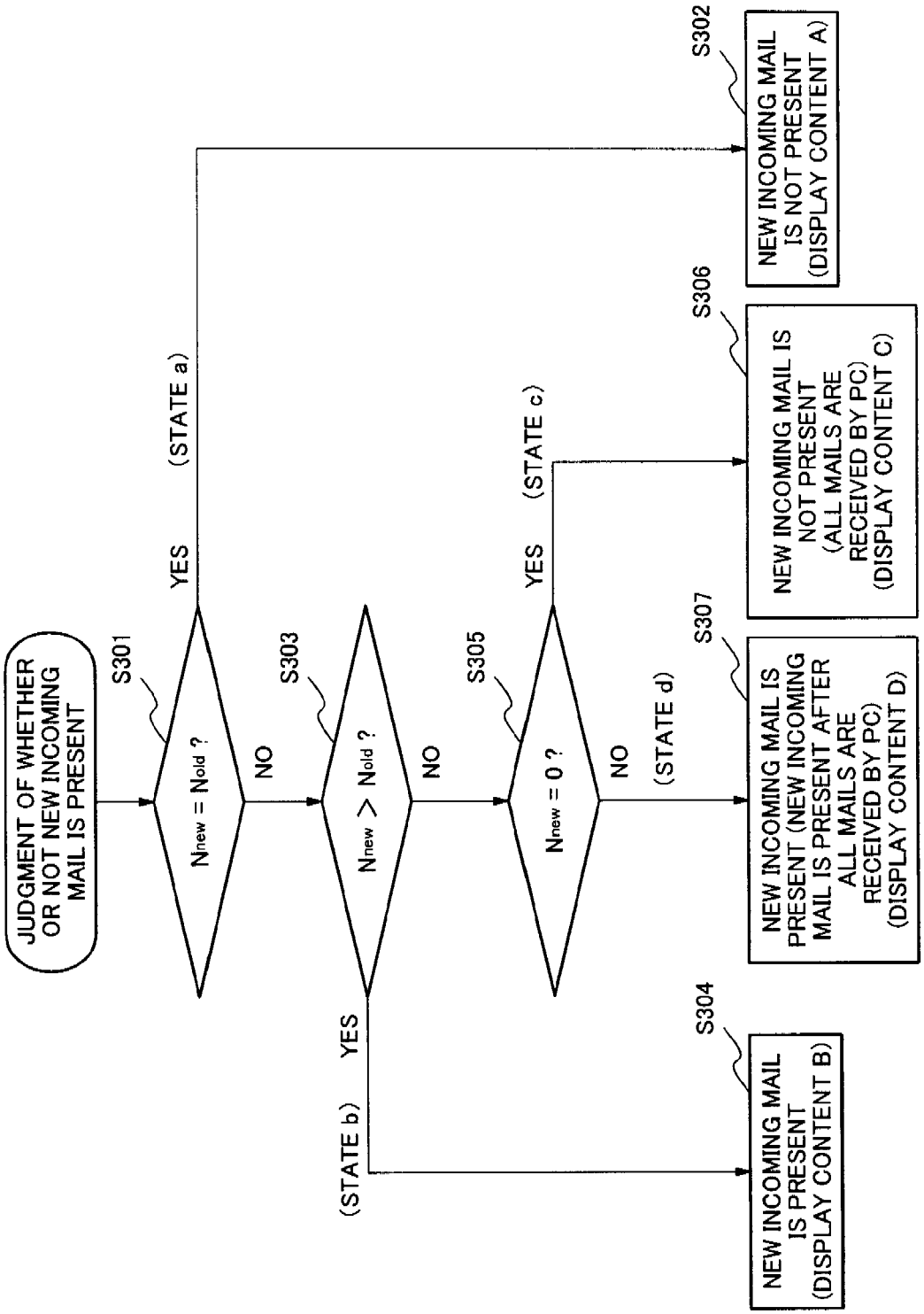
FIG. 4 is an example of a flowchart illustrating in detail a judgment of whether or not a new incoming mail is present.

FIG. 4 is an example of a flowchart describing in detail a judgment of whether or not a new incoming mail is present. As mentioned above, the judgment process is carried out in the mail management unit 103. The mail management unit 103 judges whether or not the present total number $N_{new}$ of mails is equal to the previous total number $N_{old}$ of mails (step S301). When the present total number $N_{new}$ is equal to the previous total number $N_{old}$ (YES judgment in step S301), the mail management unit 103 judges that "a new incoming mail is not present" (state a). The mail management unit 103 notifies the system management unit 105 of the judgment result. The system management unit 105 controls the display unit 107 to display a display content A corresponding to the state a (step S302).

When the present total number $N_{new}$ is not equal to the previous total number $N_{old}$ (NO judgment in step S301), the mail management unit 103 judges whether or not the present total number $N_{new}$ is more than the previous total number $N_{old}$ (step S303). When the present total number $N_{new}$ is more than the previous total number $N_{old}$ (YES judgment in step S303), the mail management unit 103 judges that "a new incoming mail is present" (state b). The mail management unit 103 notifies the system management unit 105 of the judgment result. The system management unit 105 controls the display unit 107 to display a display content B corresponding to the state b (step S304).

When the present total number $N_{new}$ is equal to or less than the previous total number $N_{old}$ (NO judgment in step S303), the mail management unit 103 judges that a mail kept on the mail server 23 is received by the PC 11 that is another device different from the communication device 10.

Here, the reason why the mail management unit 103 judges as the above mentioned will be described. It is assumed that the communication device 10 periodically receives a mail from the mail server 23 and, the PC 11 receives a mail from the mail server 23 at random times. When only the communication device 10 accesses the mail server 23, the present total number $N_{new}$ of mails is not less than the previous total number $N_{old}$ of mails. That is, in the above-mentioned assumption, a state in which the present total number $N_{new}$ of mails is less than the previous total number $N_{old}$ of mails means that mails has been received at random times that is, mails has been received by the PC 11.

In FIG. 4, the mail management unit 103 judges whether or not the present total number $N_{new}$ is zero (step S305). When the present total number $N_{new}$ is zero (YES judgment in step S305), the mail management unit 103 judges that "all mails in a mailbox are received by the PC 11 and a new mail is not arrived after that" (state c). The mail management unit 103 notifies the system management unit 105 of the judgment result. The system management unit 105 controls the display unit 107 to display a display content C corresponding to the state c (step S306).

Here, by differentiating the display content A from the display content C, a user can easily distinguish a state in which just new incoming mail is not present from a state in which no new incoming mails exists because mails have been received by the PC 11. Here, differentiation between two display contents means for example, differentiation of blinking patterns of an LED, differentiation of LCD display messages or differentiation of output sounds of a speaker (not shown).

When the present total number $N_{new}$ is not zero (NO judgment in step S305), the mail management unit 103 judges that "all mails in a mailbox are received by the PC 11 and a new mail arrives after that" (state d). The mail management unit 103 notifies the system management unit 105 of the judgment result. The system management unit 105 controls the display unit 107 to display a display content D corresponding to the state d (step S307).

Here, by differentiating the display content B from the display content D, a user can easily distinguish a new incoming mail that has just arrived from a new incoming mail that arrives after reception of all mails by the PC 11. Here, two display contents are differentiated from each other as mentioned above.

A user can easily recognize whether or not a new incoming mail is present by the above-mentioned display contents A to D. Moreover, when a new incoming mail is present, a user can receive the new incoming mail from the mail server 23 by the communication device 10 or the PC 11 to read the mail addressed to oneself.

As described above, the communication device 10 of a first exemplary embodiment of the present invention compares the present total number $N_{new}$ of mails with the previous total number $N_{old}$ of mails. The communication device 10 judges whether or not a new incoming mail is present and whether or not a new incoming mail that is received from the mail server 23 by another communication device (for example, the PC 11) different from the communication device 10 is present based on the comparison result. Accordingly, in an e-mail system including a mail server which receives an access from a plurality of communication devices, a user can accurately grasp a reception state of a new incoming mail.

In order to judge whether or not a new incoming mail is present, the communication device 10 periodically transmits a STAT command that is a message for requesting the mail server 23 to check a mail storage state to the mail server 23 and, detects a change in a storage state from a previous mail storage state to check existence of a new incoming mail. Accordingly, a user can recognize existence of a new incoming mail in real time without an unnecessary operation.

A message ID and a UIDL (Unique ID Listing) are usually used in order to judge whether or not a new incoming mail is present. In the method, since information for each mail needs to be managed by a client side memory, increase of a memory capacity and increase of a CPU load are caused. In a built-in device, in order to keep information even when an unexpected power supply failure (electrical power failure) occurs, mail management information has to be stored in a nonvolatile memory such as FLASH.

However, as mentioned above, the communication device 10 obtains the total number of mails from the mail server 23 by a STAT command and compared the number with the previous total number of mails. That is, information managed in the communication device 10 is only information about the previous total number. Accordingly, increase of a memory capacity and increase of a CPU load can be avoided.

Figure 5:
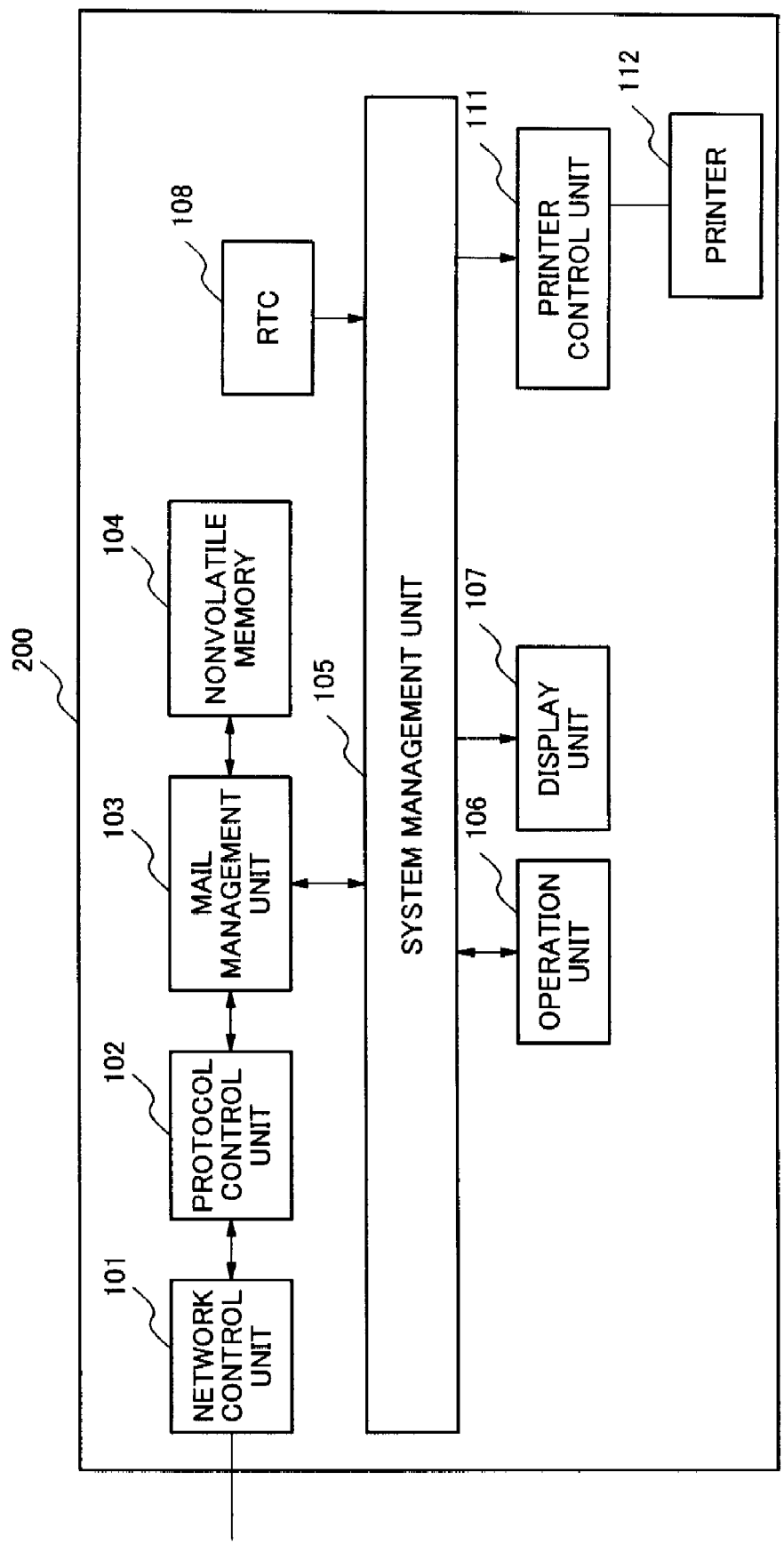
FIG. 5 is an example of a control block diagram of a communication device according to a third exemplary embodiment of the present invention.

FIG. 5 is an example of a control block diagram of a communication device 200 according to a third exemplary embodiment of the present invention. Reference marks used for a component shown in FIG. 5 are the same as these of the communication device 10 shown in FIG. 2. Thus, descriptions of the component will be omitted. The communication device 200 further includes a printer control unit 111 and a printer 112 in addition to units included in the communication device 10. The printer control unit 111 receives a new incoming mail from the mail management unit 103 and converts a format of the new incoming mail into a format that the printer 112 can print. The printer control unit 111 transmits the new incoming mail after the format conversion to the printer 112. The printer 112 prints the new incoming mail.

An operation of the communication device 200 will be described. Further, a basic operation and an operation of a judgment of whether or not a new incoming mail is present in the communication device 200 are the same as those of the communication device 10. In FIG. 4, when the mail management unit 103 judges that a new incoming mail is present (step S304 or S307), the system management unit 105 downloads a new incoming mail from the mail server 23. The system management unit 105 transmits the downloaded new incoming mail to the printer control unit 111. The printer control unit 111 converts a format of the received new incoming mail into a format for the printer 112 and transmits the mail with the converted format to the printer 112. The printer 112 prints the new incoming mail.

As described above, when the communication device 200 of the second exemplary embodiment of the present invention detects that a new incoming mail is present, the device 200 automatically prints the mail. Accordingly, a new incoming mail can be easily obtained as paper information without a user's unnecessary operation.

Figure 6:
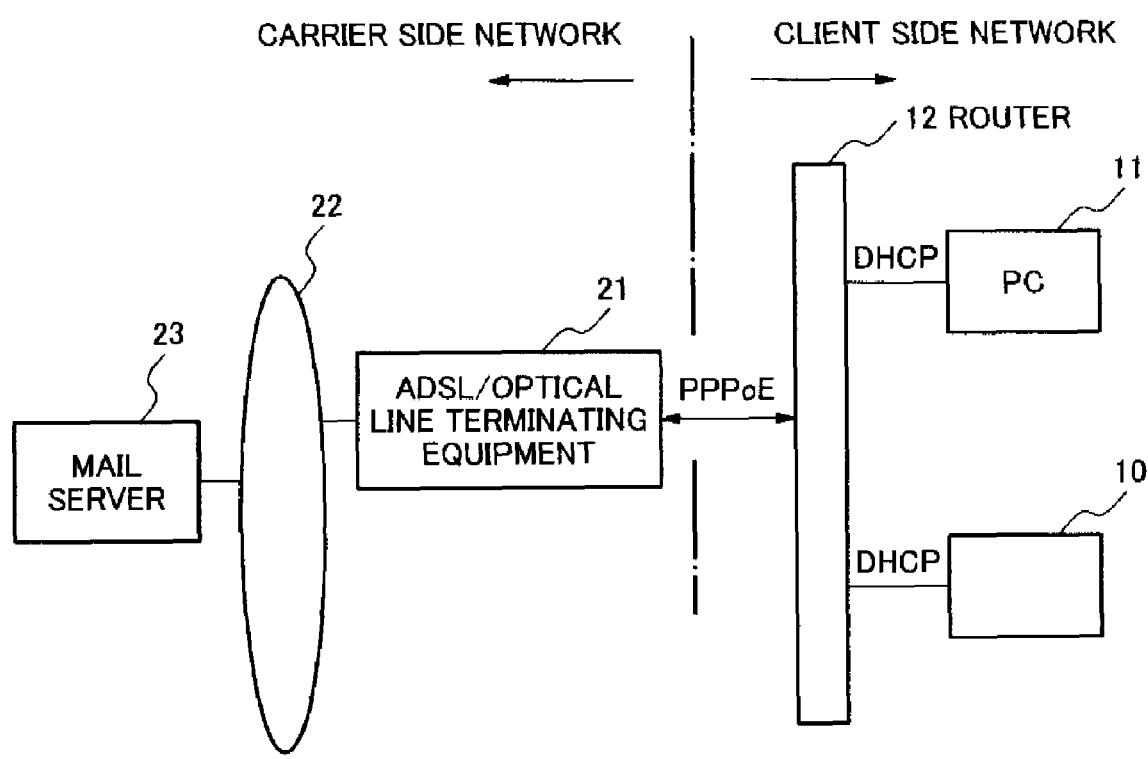
FIG. 6 is an example of a control block diagram showing a first example of connections among a communication device, a PC and ADSL/optical line terminating equipment.

FIG. 6 is an example of a control block diagram showing a first example of connections among the communication device 10, the PC 11 and the ADSL/optical line terminating equipment 21. The communication device 10 and the PC 11 are connected with the ADSL/optical line terminating equipment 21 via a router 12. The connections among the communication device 10, the PC 11 and the router 12 can be made by a wire or a wireless connection. In the embodiment, a PPPoE (Point to Point Protocol over Ethernet) communication is performed between the ADSL/optical line terminating equipment 21 and the router 12 to resolve the global address ("Ethernet" is a registered trademark). An IP address is assigned by DHCP (Dynamic Host Configuration Protocol). The communication device 10 and the PC 11 can perform TCP/IP communication with the mail server 23 of a carrier side network using the IP address.

Figure 7:
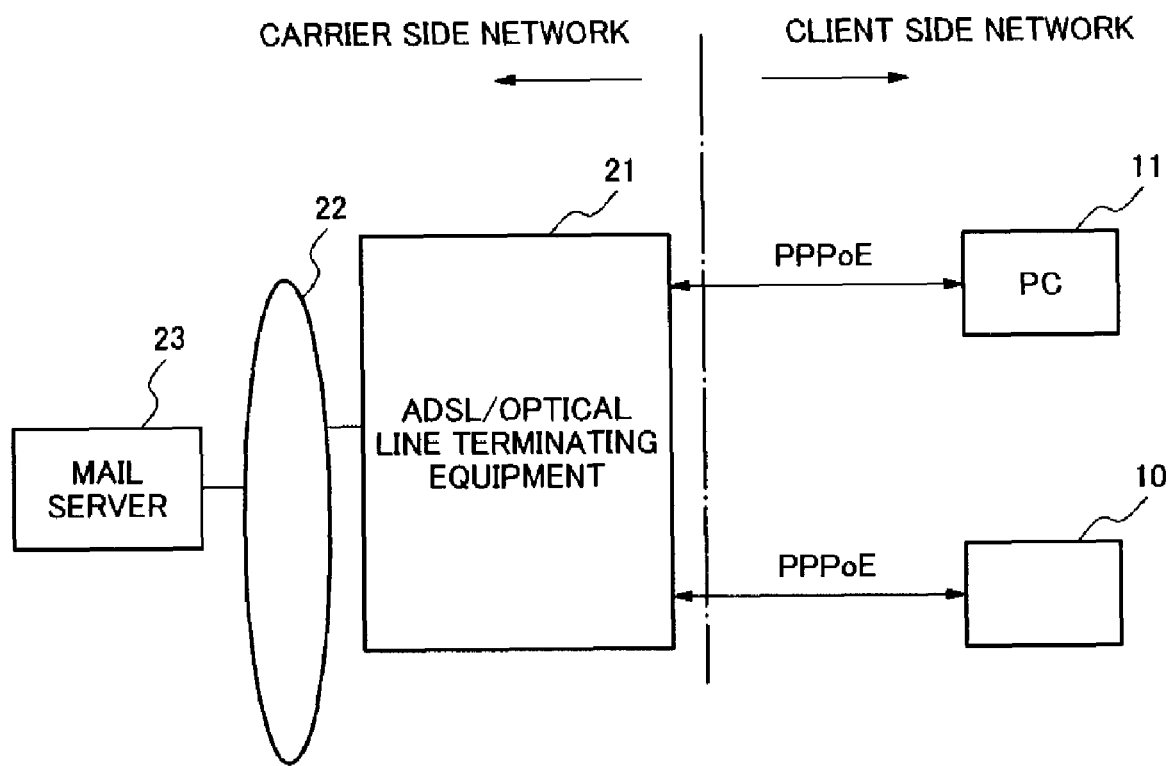
FIG. 7 is an example of a control block diagram showing a second example of connections among a communication device, a PC and ADSL/optical line terminating equipment.

FIG. 7 is an example of a control block diagram showing a second example of connections among the communication device 10, the PC 11 and the ADSL/optical line terminating equipment 21. The communication device 10 and the PC 11 are directly connected to the ADSL/optical line terminating equipment 21 without the router. Addresses of the communication device 10 and the PC 11 are directly assigned by PPPoE from a carrier side. The communication device 10 and the PC 11 can perform TCP/IP communication with the mail server 23 of a carrier side network by using the address.

A communication device with a mail monitoring function according to a fourth exemplary embodiment of the present invention acquires the present total number of mails stored in a mailbox by periodically logging on to a mail server and compares the present total number of mails with the previous total number of mails acquired at the last logon, and judges, based on the comparison result, whether or not a mail client has received a mail from a mail server by using a mail function of another communication terminal. For example, when the present total number of mails is equal to the previous total number of mails, the communication device judges that a new incoming mail is not present. When the present total number of mails is more than the previous total number of mails, the communication device judges that a new incoming mail is present.

When the present total number of mails is equal to or less than the previous total number of mails, it is desirable to judge whether or not a new mail arrives after reception of all mails by a mail client, according to whether or not the present total number of mails is zero. More specifically, when the present total number of mails is zero, it is judged that an incoming mail is not present and, when the incoming mail is not zero, it is judged that an incoming mail is present.

A communication device with a mail monitoring function according to a fifth exemplary embodiment of the present invention distinguishes a first mail storage state in which the present total number of mails is equal to the previous total number of mails from a second mail storage state in which no incoming mail arrives after reception of all mails by the mail client and, displays the storage states, in different forms, on a display unit in order to inform the above mail client of absence of an incoming mail. Additionally, the communication device with a mail monitoring function according to a forth exemplary embodiment of the present invention distinguishes a third mail storage state in which the present total number of mails is more than the previous total number of mails from a forth mail storage state in which an incoming mail arrives after reception of all mails by the mail client and, displays the storage states, in a different form, on a display unit in order to inform the above mail client of presence of an incoming mail.

Due to the configuration, existence of a new incoming mail is informed to a user by another communication terminal. And, a client can accurately grasp a mail storage state in the mail server.

Japanese Patent Application Laid-Open No. 2007-034559 discloses a mobile terminal which automatically notifies a user of existence of a new incoming mail. Specifically, the mobile terminal periodically transmits a message for requesting a mail server to check a mail storage state and detects a change in a state from a previous mail storage state to check existence of a new incoming mail. However, an e-mail is utilized in a PC (Personal Computer) system. PC is not carried around by the user at any time. In a PC system including the e-mail function disclosed in above official bulletin, a notification of existence of a new incoming mail is not notified in real time.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. An e-mail check method in a communication device accessing a mail server, the e-mail check method comprising:
   accessing said mail server periodically and acquiring a total number of mails at each access;
   comparing a total number of mails currently acquired with a total number of mails acquired last time; and
   judging whether or not a new incoming mail is present and whether or not a different communication device receives a mail from said mail server, based on a result of said comparing, wherein said different communication device is used by a same user as said communications device,
   wherein when said total number of mails currently acquired is equal to said total number of mails acquired last time, judging said new incoming mail is not present;
   when said total number of mails currently acquired is more than said total number of mails acquired last time, judging said new incoming mail is present;
   when said total number of mails currently acquired is less than said total number of mails acquired last time, determining whether or not said total number of mails currently acquired is zero and,
   judging, based on a result of said determining, whether or not an incoming mail arrives after reception of all mails from said mail server by said different communication device;
   wherein when said total number of mails currently acquired is equal to said total number of mails acquired last time and when no incoming mail arrives after reception of all mails from said mail server by said different communication device, reporting said new incoming mail is not present; and
   a content reported when said total number of mails currently acquired is equal to said total number of mails acquired last time is different from a content reported when no incoming mail arrives after reception of all mails from said mail server by said different communication device.

2. The e-mail check method according to claim 1, wherein when said total number of mails currently acquired is less than said total number of mails acquired last time and said total number of mails currently acquired is not zero, judging said incoming mail arrives after reception of all mails from said mail server by said different communication device.

3. The e-mail check method according to claim 1, wherein when said total number of mails currently acquired is less than said total number of mails acquired last time and said total number of mails currently acquired is zero, judging no incoming mail arrives after reception of all mails from said mail server by said different communication device.

4. The e-mail check method according to claim 1, wherein when said total number of mails currently acquired is more than said total number of mails acquired last time and when said incoming mail arrives after reception of all mails from said mail server by said different communication device, reporting said new incoming mail is present.

5. The e-mail check method according to claim 4, wherein
a content reported when said total number of mails currently acquired is more than said total number of mails acquired last time is different from a content reported when said incoming mail arrives after reception of all mails from said mail server by said different communication device.

6. A communication device accessing a mail server, the communication device comprising:

a mail management unit, implemented by a processor, periodically accessing said mail server and acquiring a total number of mails at each access;

comparing a total number of mails currently acquired with a total number of mails acquired last time and judging whether or not a new incoming mail is present and whether or not a different communication device receives a mail from said mail server, based on a result of said comparing, wherein the different communication device is used by a same user as said communications device; and reporting content based on the result of said comparing, wherein when said total number of mails currently acquired is equal to said total number of mails acquired last time and when no incoming mail arrives after reception of all mails from said mail server by said different communication device, reporting said new incoming mail is not present; and a content reported when said total number of mails currently acquired is equal to said total number of mails acquired last time is different from a content reported when no incoming mail arrives after reception of all mails from said mail server by said different communication device.

* * * * *